United States Patent [19]

Barnes

[11] Patent Number: 4,771,272
[45] Date of Patent: Sep. 13, 1988

[54] PENDENT LIQUID LEVEL ALARM APPARATUS

[76] Inventor: Arthur Barnes, 339 E. Las Palmas, Fullerton, Calif. 92635

[21] Appl. No.: 904,458

[22] Filed: Sep. 8, 1986

[51] Int. Cl.⁴ .............................................. G08B 21/00
[52] U.S. Cl. ..................................... 340/624; 73/308; 73/DIG. 5; 200/84 C
[58] Field of Search ............... 340/618, 623, 624, 625, 340/59; 200/61.2, 84 C; 335/219, 153, 205, 154; 73/305, 308, 313, DIG. 5

[56] References Cited

U.S. PATENT DOCUMENTS

| | | | |
|---|---|---|---|
| 3,204,230 | 8/1965 | Hosford, Jr. | 340/624 |
| 3,377,537 | 4/1968 | Brailsford | 340/624 X |
| 3,849,771 | 11/1974 | Applin | 340/624 |
| 4,080,985 | 3/1978 | Eagle | 340/624 X |
| 4,255,747 | 3/1981 | Bunia | 340/624 |
| 4,279,078 | 7/1981 | Hinshaw et al. | 340/620 X |
| 4,442,405 | 4/1984 | Andrejasich et al. | 73/308 |

Primary Examiner—Joseph A. Orsino
Assistant Examiner—Jeffery A. Hofsass
Attorney, Agent, or Firm—William L. Chapin

[57] ABSTRACT

A liquid level electrical alarm apparatus includes a perforated hollow cylindrical sensor housing having upper and lower cup-shaped caps. A cylindrical float contained within the sensor housing contains a permanent magnet near its upper end, effective in closing the contact bars of a reed switch element mounted in the upper cap when the float rises a pre-determined level. The sensor body is suspended by a flexible electrical cable connected to the upper cap. Means are provided for adjusting the length of cable from which the sensor is suspended into a vessel, thereby permitting adjustment of the liquid level which trips the alarm.

24 Claims, 4 Drawing Sheets

U.S. Patent  Sep. 13, 1988  Sheet 1 of 4  4,771,272
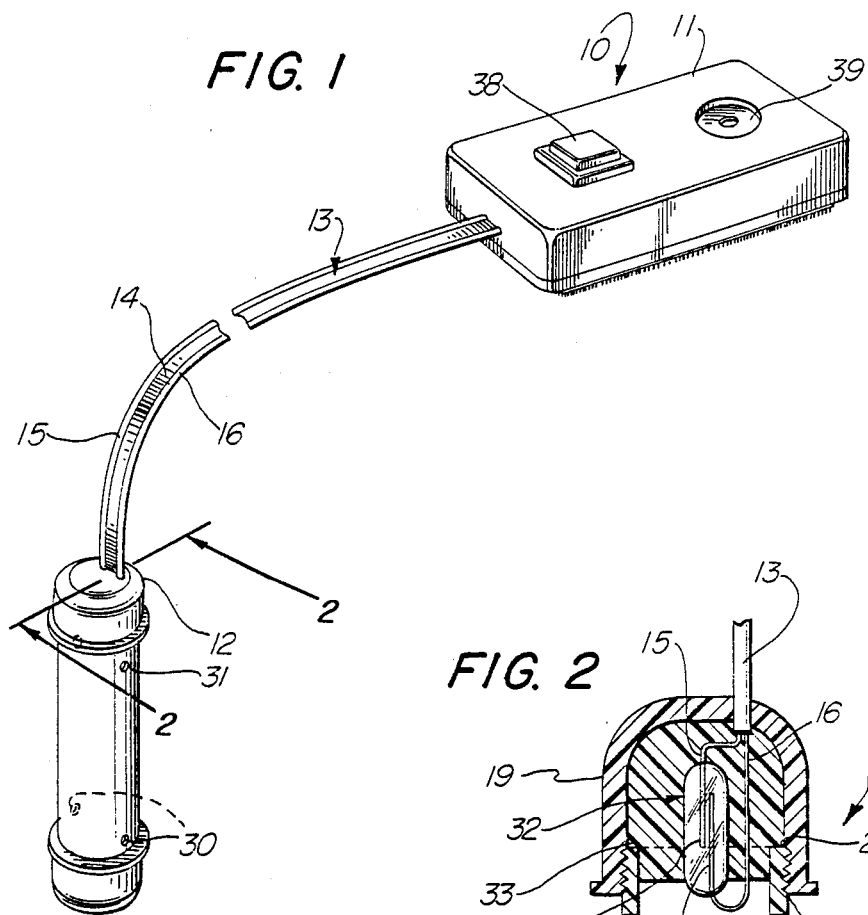
FIG. 1
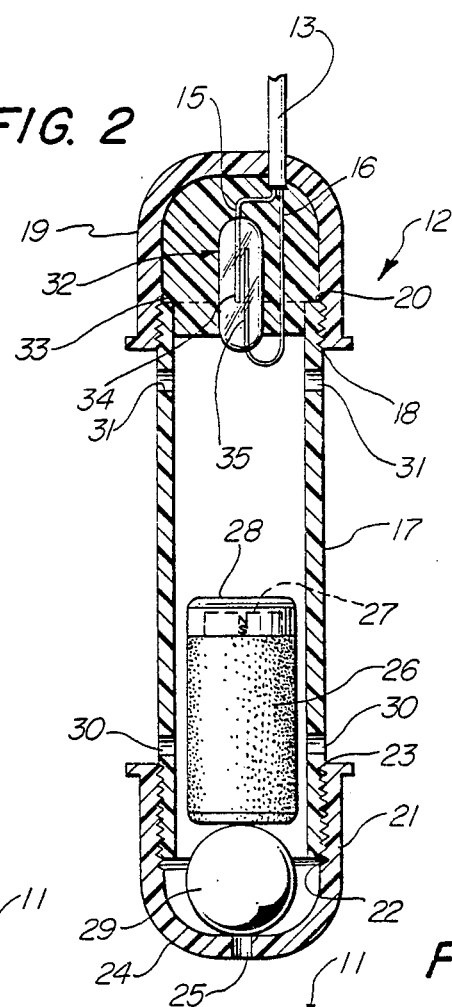
FIG. 2
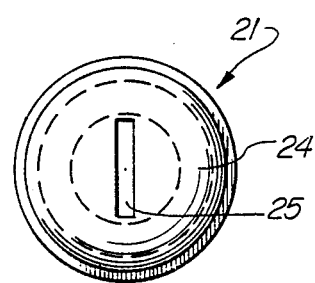
FIG. 3
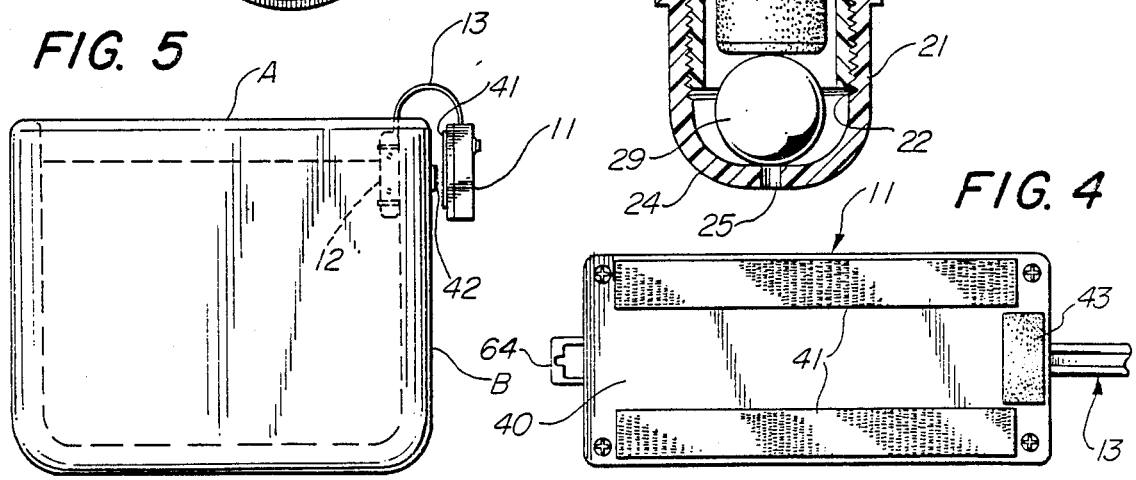
FIG. 5
FIG. 4

PENDENT LIQUID LEVEL ALARM APPARATUS

BACKGROUND OF THE INVENTION

1. Field of the Invention

This invention relates to devices for providing an indication of water or other liquid rising above a pre-determined level. More particularly, the invention relates to an apparatus for placement near a container being filled with liquid, and which provides an audible alarm when the liquid rises to a pre-determined level.

2. Description of Background Art

Filling bathtubs, swimming pools and the like with water to a desired level takes a substantial period of time. For that reason, the person responsible for shutting off the water flow when the water reaches the desired level must be in attendance to observe the filling of the vessel for a long period of time. Alternatively, the person may go about other activities in areas remote from the vessel during the filling operation. But this requires frequent returns to the vessel to check on the filling operation. To eliminate wasted time and energy, it would therefore be desirable to provide means for indicating to a person remote from the vicinity of the vessel being filled with water or other liquid when liquid in the vessel has risen to a pre-determined level.

Other inventors have responded to a perceived need for providing a remote indication when water in a vessel reaches a pre-determined height. Typical prior art inventions providing such an indication utilize a float to close an electrical switch when the float is bouyed to a pre-determined height by water rising in a vessel. The switch is in series with a source of electrical power and an audible alarm, such as a bell, thus providing an audible signal when the water in the vessel reaches a pre-determined level. Examples of prior art water level alarms are disclosed in the following U.S. Pat. Nos.:

Bishop, 741,759, Oct. 20, 1903, Overflow Alarm.
Milo, 3,633,193, Jan. 4, 1972, Warning System for Preventing Overfill in Underground Tanks Having a Gage Box.
Applin, 3,879,771, Nov. 19, 1974, Liquid Level Alarm.

Prior art alarms of the type disclosed in the above-cited patents appear to be more or less effective in performing their intended function. However, prior art alarms each have certain inherent design characteristics which limit their usefulness. Most importantly, none of the prior art alarms has the capability of being used with a wide variety of shapes and sizes of vessels. The liquid level alarm according to the present invention performs efficiently with a wide variety of vessels and has other novel and advantageous features, which are described below.

OBJECTS OF THE INVENTION

An object of the present invention is to provide a liquid level alarm apparatus which may be positioned near a vessel and which provides an alarm signal when liquid within the vessel reaches a pre-determined level.

Another object of the invention is to provide a liquid level alarm apparatus in which the set point of that liquid level which triggers the alarm is easily adjusted.

Another object of the invention is to provide a liquid level alarm apparatus which is useable with a wide variety of vessel shapes, including vessels with sloping side walls.

Another object of the invention is to provide a liquid level alarm apparatus which may be readily transported between, and used interchangeably with, a wide variety of vessels.

Various other objects and advantages of the present invention, and its most novel features, will be made apparent in the descriptive content of the present specification and claims.

It is to be understood that although the invention disclosed herein is fully capable of achieving the objects and providing the advantages mentioned, the structural and operational characteristics of the invention described herein are merely illustrative of the preferred embodiments. Accordingly, I do not intend that the scope of my exclusive rights and privileges in the invention be limited to the details of construction and operation described. I do intend that reasonable equivalents adaptations and modifications of the various embodiments and alternate forms of the present invention which are described herein be included within the scope of the invention as particularly pointed out by the appended claims.

SUMMARY OF THE INVENTION

Briefly stated, the present invention comprehends a liquid level alarm apparatus in which a pendent liquid level sensor is suspended at a desired height within a vessel by means of a flexible cable. The sensor includes a hollow, elongated cylindrical housing closed at both upper and lower ends by cylindrical caps. Perforations in the housing permit water or other liquid to enter and exit from the interior of the housing. A cylindrical float contained coaxially within the housing has a permanent magnet recessed into its upper surface. A reed switch element electrically connected to two conductors within the suspending cable is activateable by the field of the permanent magnet when the float is buoyed up sufficiently close to the reed switch by liquid rising within the enclosure. The end of the cable distant from the sensor is connected to an enclosure containing an electrical power source and audible alarm connected in series with the conductors joined to the reed switch element. Means are provided for adjusting the height at which the sensor is suspended, therefore permitting adjustment of the liquid level which trips the audible alarm.

BRIEF DESCRIPTION OF THE DRAWINGS

FIG. 1 is an upper perspective view of a pendent liquid level alarm apparatus according to the present invention.

FIG. 2 is a sectional side elevation view of the sensor portion of the apparatus of FIG. 1.

FIG. 3 is a bottom plan view of the sensor of FIG. 2.

FIG. 4 is a bottom plan view of the control box portion of the apparatus of FIG. 1.

FIG. 5 is a side elevation view of the apparatus of FIG. 1 preparatory to the attachment of the apparatus to a vessel.

DETAILED DESCRIPTION OF THE INVENTION

Figure 6:
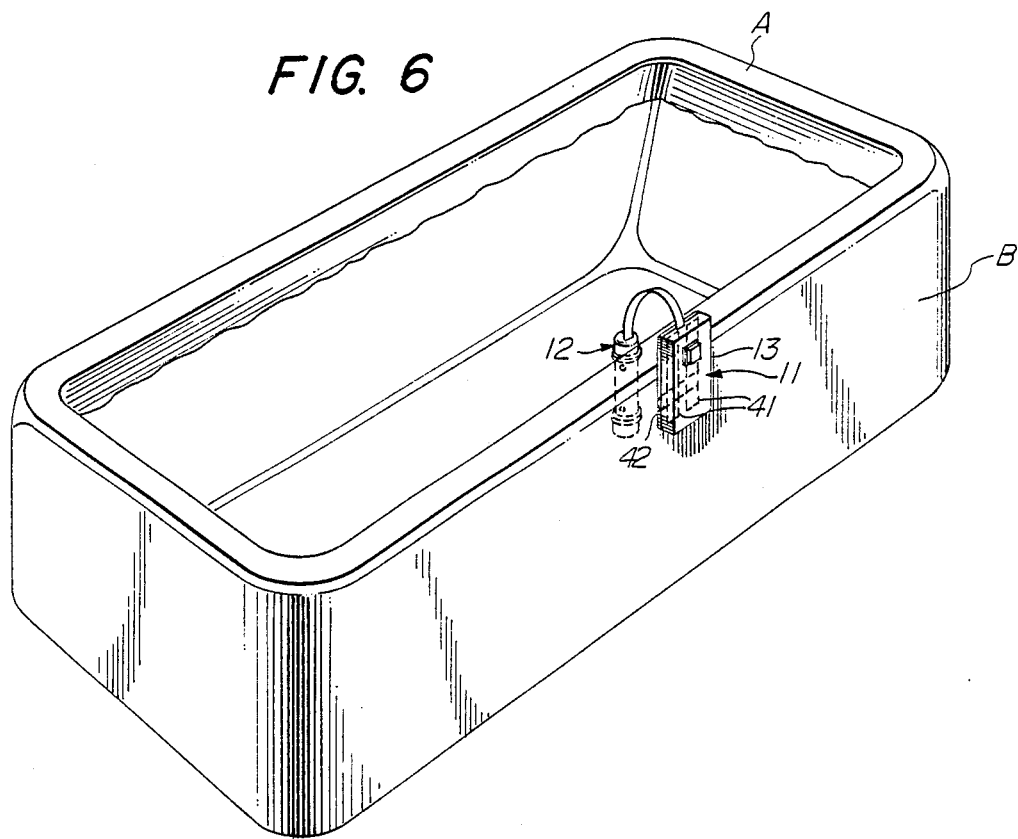
FIG. 6 is a perspective view of the apparatus of FIG. 1 shown attached to a vessel.

Referring now to FIG. 1, a pendent liquid level alarm apparatus 10 according to the present invention is shown. As shown in FIG. 1, the alarm apparatus 10 includes a control box 11 joined to a generally cylindrically-shaped sensor element or sensor 12 by a flexible electrical cable 13. As shown in the Figure, cable 13 consists of a flexible rectangular cross section strip of insulating material 14 having two embedded and flexible stranded copper conductors 15 and 16 and disposed at opposite lateral edges of strip 14. Cables thus constructed are readily available. For example, standard 300-ohm television antenna lead-in cable may be cut to the proper length to comprise cable 13. Conductors 15 and 16 of cable 13 provide electrical connections between components of the sensor 12 and control box 11, as will be described below.

Referring now to FIG. 2, sensor 12 may be seen to include an elongated hollow cylindrical tube or pipe 17 having a closed upper transverse end. In a preferred method of construction for sensor 12, the outer cylindrical surface of the upper end portion of tube 17 contains external threads 18. The upper opening of tube 17 is then sealed by a cylindrical cup-shaped, top cap or nipple 19 having internal threads 20. Both tube 17 and cap 19 are fabricated from a durable, liquid resistant, non-corroding material, preferably a non-ferrous material such as polyvinyl chloride (PVC) plastic.

As my also be seen best by referring to FIG. 2, the lower end of tube 17 contains a cup-shaped cylindrical bottom cap or nipple 21 secured to the lower end of the tube by means of internal threads 22 in the cap mating with external threads 23 on the lower portion of tube 17. Bottom cap 21 is also preferably fabricated of a non-ferrous material such as PVC plastic.

Referring now to FIG. 3, it may be seen that the bottom circular cross-section wall 24 of bottom cap 21 contains a narrow, rectangular cross-section perforation 25 cut through the wall. Perforation 25 is symmetrically disposed on a diameter of bottom wall 24, and extends equal distances from the center of the bottom wall.

Referring again to FIG. 2, it may be seen that the hollow cylindrical tube 17 of sensor 12 contains an elongated cylindrical float 26. Float 26 is fabricated from a light, bouyant, water imperious material such as cork, wood, or a closed-cell synthetic plastic foam material. The outer diameter of float 26 is slightly less than the inner diameter of tube 17, and the length of the float is substantially greater than the inner diameter of the tube. Thus, float 26 is contained coaxially and slidably within tube 17. As shown in FIG. 2, float 26 includes a permanent magnet 27 which is fastened to the float below the upper transverse face of the float. Permanent magnet 27 is preferably a rust-resisting ceramic magnet with flat and parallel upper and lower surfaces adapting the magnet to be cemented in flush contact with the upper surface of float 26. Magnet 22 is preferably magnetized perpendicularly through its thickness dimension, resulting in a magnet having an upper surface of one magnetic polarity and a lower surface of opposite polarity.

In the preferred method of construction, the upper surface of the float 26 with attached magnet 27 is encapsulated with a water resistant material such as epoxy resin. Thus, the finished appearance of float 26 is that of a cylinder with an integral plastic cap 28 of relatively narrow thickness.

With sensor 12 suspended with the longitudinal axis of its cylindrical body 17 in a generally vertical position, out of water, float 26 normally rests on the upper surface of a sphere 29 contained within cylindrical tube 17, below the float. The diameter of sphere 29 is less than the inner diameter of tube 17, but is not critical. Preferably sphere 29 is fabricated from a relatively heavy, rust-resistant material such as stainless stell or brass. With sensor 12 suspended in a generally vertical position, sphere 29 rests on the upper surface of disc-shaped bottom wall 24 of bottom cap 22. In this position, sphere 29 partially occludes slit 25 in bottom wall 24.

Radial holes 30 through the cylindrical side wall of the tube 17 are provided which permit liquid to enter the interior of cylindrical tube 17 when the lower end of sensor 12 is immersed in liquid. Preferably radial holes 30 are located slightly above the upper transverse surface of bottom cap 22. Radial holes 31 through the side wall of cylindrical tube 17 near upper cap 19 permit air displaced from the interior of the cylindrical tube by liquid rising therein to escape from the tube. Slit 25 in bottom cap 22 of tube 17 serves as a drain hole, allowing all of the liquid within the tube to vacate the unit after use.

As shown in FIG. 2, a sensor 12 includes a switch element 32 which is encapsulated inside of upper cap 19 of tube 17. Switch element 32 is of the type referred to as a magnetic reed switch. It includes a hermetically sealed, elongated glass tube 33 having longitudinally disposed wire contact bars 34 and 35 sealed in opposite ends of the tube. The contact bars are electrically connected to conductors 15 and 16 of cable 13.

The contact bars 34 and 35 are made of an elastic, magnetically soft material such as a chrome-iron alloy, and are normally positioned so that a small gap exists between the adjacent free ends of the bars. When a sufficiently large longitudinal magnetic field has been externally impressed on switch element 32, contact bars 34 and 35 are drawn together to make an electrically conducting contact closure between the free ends of the contact bars.

When the liquid level within cylindrical tube 17 of sensor 12 rises, float 26 is buoyed up closer to switch element 32 inside cap 19 of the cylindrical tube. When permanent magnet 27 approaches switch element 32, a longitudinally disposed magnetic field of increasing strength is imposed on the switch element. When the magnet approaches sufficiently close to the switch element, the contact bars 34 and 35 are drawn into contact, causing electrical contact to occur between the contact bars. The closure of contact bars 34 and 35 is effective in actuating an audible alarm contained in alarm apparatus 10, as will now be described.

Figure 7:
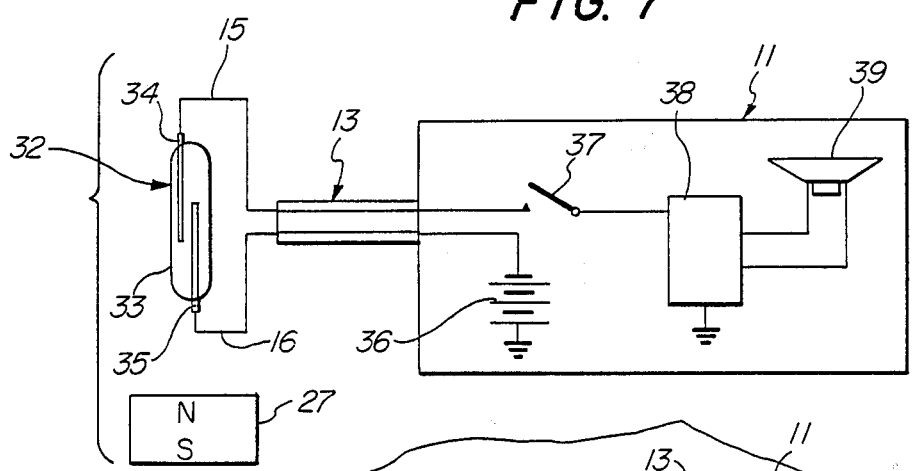
FIG. 7 is a schematic electrical diagram of the apparatus of FIG. 1.

Referring now to FIG. 7, it may be seen that switch element 32 is electrically connected to control box 11 of alarm apparatus 10 by means of twin-conductor interconnecting cable 13. As shown in FIG. 7, control box 11 contains a battery 36 wired in series with switch element 32 by means of conductors 15 and 16 of control cable 13. Conductor 15 is in turn connected in series with power on/off switch 37 and alarm driver module 38. The output port of alarm driver module 38 is connected to an audible transducer 39 such as an audio speaker or piezoelectric alarm transducer. Thus, with on/off switch 37 in its on position, closure of switch contact bars 34 and 35 effected by liquid rising to a pre-determined height within cylindrical tube 17 of sensor 12 causes audible transducer 39 to produce an audible alarm signal.

Sphere 29 in cylindrical tube 17 of pendent sensor 12 serves three important and distinct functions in the operation of the sensor. First, the weight of sphere 29 and its normal rest position near the bottom of the sensor serves as a plumb bob weight, causing the sensor to hang in a generally vertical suspended position within a liquid, in spite of the buoyancy of float 26 and any buoyancy of suspending cable 13 or other elements of the sensor.

As to the second function of sphere 29, the tangential contact region between the upper surface of sphere 29 and the bottom flat surface of float 26 has inherently a small area. The small contact area insures that adhesion resulting from surface tension or soap films as the sphere or float will be necessarily small, preventing the float from sticking in a submerged position when water enters tube 17.

The third function of sphere 29 is to afford means for testing the operation of the alarm apparatus 10 prior to each use. Inverting sensor 12 allows sphere 29 to fall within tube 17, pushing float 26 towards switch 32 and sounding the alarm if the apparatus is operating properly.

An important feature of the pendent liquid level alarm apparatus according to the present invention is the ease with which the alarm trip level may be adjusted. Thus, by merely adjusting the height of sensor 12, the liquid level which will trip the alarm may be adjusted. The basic embodiment of the alarm apparatus according to the present invention includes means for readily adjusting the height of sensor 12 relative to the height of liquid in a vessel, as will now be described.

Referring now to FIGS. 4 and 5, the control box 11 of alarm apparatus 10 is shown oriented with respect to a vessel A in a position in which sensor 12 is suspended within the interior of the vessel by cable 13 in a downwardly disposed, pendent position. Since cable 13 is fixed at its end opposite sensor 12 to control box 11, adjusting the height of the control box relative to the vessel controls the height of the sensor within the vessel.

In the basic embodiment of the invention illustrated in FIGS. 1 through 6, control box 11 of alarm apparatus 10 includes means for attaching the control box to the outer surface of a side wall B of a vessel A, which could be a bathtub, for example. The attachment means preferably includes a fasteners 41 permanently attached to the lower surface of bottom wall 40 of control box 11, and a complementary fastener which is permanently or semi-permanently attached to the outer surface of sidewall B of the vessel A. To permit adjusting and readjusting the trip level of alarm apparatus 10, the fasteners 41 on bottom wall 40 of control box 11 and sidewall B of vessel A should permit fastening the control box to the sidewall at given heights relative to the vessel, unfastening and removing the box, and refastening the box at a different selected height.

As may be seen best by referring to FIG. 4, the basic embodiment of the alarm apparatus 10 shown in FIGS. 1 through 6 includes a pair of elongated, rectangular, longitudinally disposed fabric fastener strips 41 fastened to the outer surface of bottom wall 40 of control box 11. An elongated, rectangular fastener 42 made of a complementary fabric is fastened to the sidewall B of vessel A in a horizontally disposed position. Complementary as here defined means that a first type of fastener strip 41, for example, contains on its surface a regular, two-dimensional array of tiny, flexible, plastic hooks. A second, complementary type fastener strip 42, for example, is formed of a deep pile fabric which contains on its surface a regular, two-dimensional array of tiny, filamentary hooks of a size and disposition readily engageable by the hooks in the first type fastener strip. The two types of fastener strips together comprise a complementary pair of fastener strips which form a strong bond when pressed together. However, the bond can be readily severed to permit readjusting the height of control box 11 by simply pulling the two fastener strips 41 and 42 apart. In this way, bonds can be made and secured repeatedly as desired. A suitable pair of materials comprising complementary hook and loop fabrics of the character described above, is known by the trademark VELCRO.

As shown in FIGS. 5 and 6, the height of sensor 12 relative to the bottom of the vessel A may be adjusted by first positioning control box 11 vertically to a desired height with respect to fastener strip 42 fastened to sidewall B of the vessel. Then the fastener strips 41 on the bottom wall of the control box are pressed into engagement with the fastener strip 42 on the vessel sidewall. To re-adjust the height of sensor 12 so that the alarm apparatus 10 will be triggered at a different liquid level in vessel A, the bond between complementary fastener strips 41 and 42 can be severed by applying a pulling force on control box 11 at an angle with respect to the normal of the fastener strip, and progressively peeling the fastener strips apart. The control box may then be re-fastened to vessel A at a different height in the manner described above. Thus, the water level at which the alarm apparatus according to the present invention means trips is very conveniently and easily adjusted.

As may be seen best by referring to FIG. 4, a rectangular friction strip 43 is fastened to the bottom wall 40 of control box 11, parallel and close to the short edge of the box near that end of the box through which interconnection cable 13 passes. Friction strip 43 is made of a material such as soft rubber which has a high coefficient of sliding friction in contact with such materials as concrete.

Figure 8:
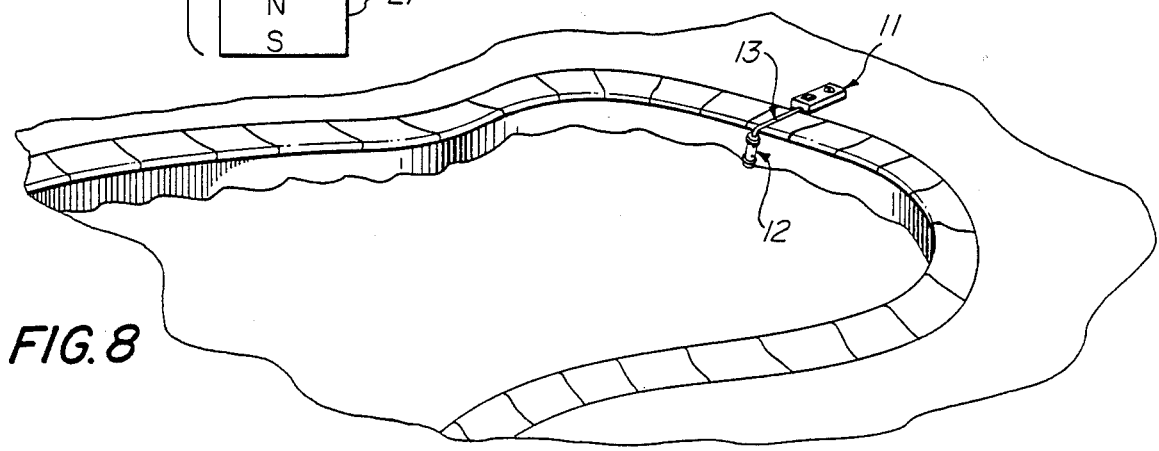
FIG. 8 is a perspective view of the apparatus of FIG. 1 in use with a vessel having an inaccessible outer side wall, such as a swimming pool.

The purpose of friction strip 43 is to prevent control box 11 from sliding on a flat horizontal surface on which the bottom wall 40 of the control box rests. The non-slip capability provided by friction strip 43 permits the use of alarm apparatus 10 with vessels not having an accessible outer side wall, such as swimming pools, for example. Thus, as shown in FIG. 8, control box 11 of the alarm apparatus may be placed on a horizontal surface adjacent to a swimming pool, moved to a position in which pendent sensor 12 is suspended at a desired trip height, and retained in that position by the resistance afforded by friction strip 43 to sliding movement of control box 11.

Figure 9:
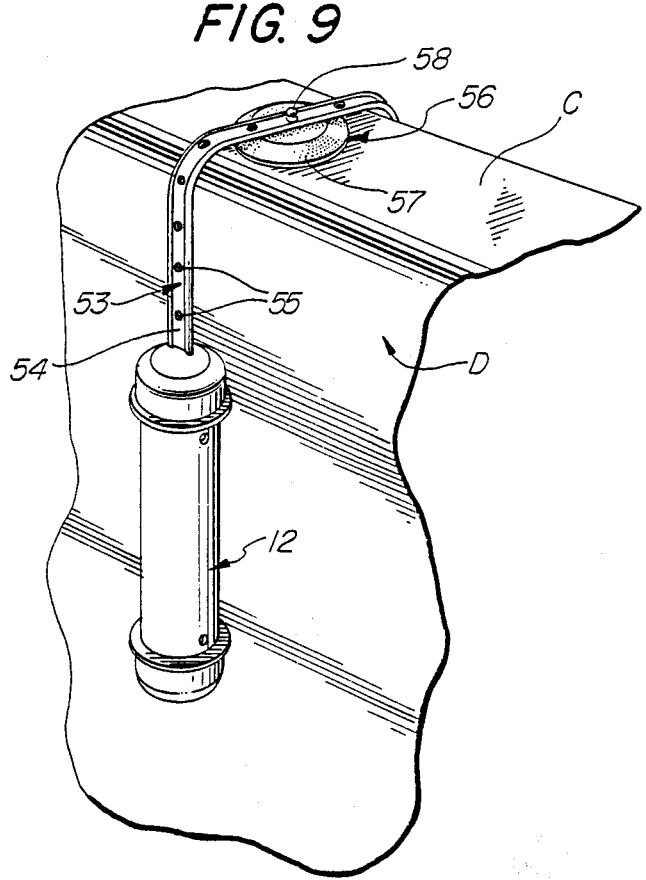
FIG. 9 is a fragmentary perspective view of a modification of the apparatus of FIG. 1 having different mounting means.

A modified version of apparatus 10 having a different means for adjusting the height of pendent sensor 12 relative to the interior of a vessel is shown in FIG. 9.

In the modified alarm apparatus shown in FIG. 9, interconnecting cable 53 contains a plurality of perforations through the rectangular insulating body 54 of the cable. The perforations 55 are preferably disposed at equal intervals along the longitudinal center line of interconnecting cable 53.

Also included in the modified alarm apparatus of FIG. 9 is a suction cup 56 having a flexible, convex lenticular-shaped body 57 made of an air imperious resilient material such as rubber. A coaxial stud 58 projects upward from the convex face of the body 57. The outer diameter of stud 58 is of the proper size and shape to insert snugly into a selected one of the perforations 55. Thus, as shown in FIG. 9, suction cup 56 may be attached to the horizontal ledge C of a bathtub D. Interconnecting cable 53 of alarm apparatus is then laid over the suction cup, with sensor 12 suspended within the bathtub and control box 11 suspended outside the tub. Sensor 12 is then adjusted to the desired height within bathtub D, and maintained at that height by pushing the closest perforation to stud 58 down over the stud.

Figure 10:
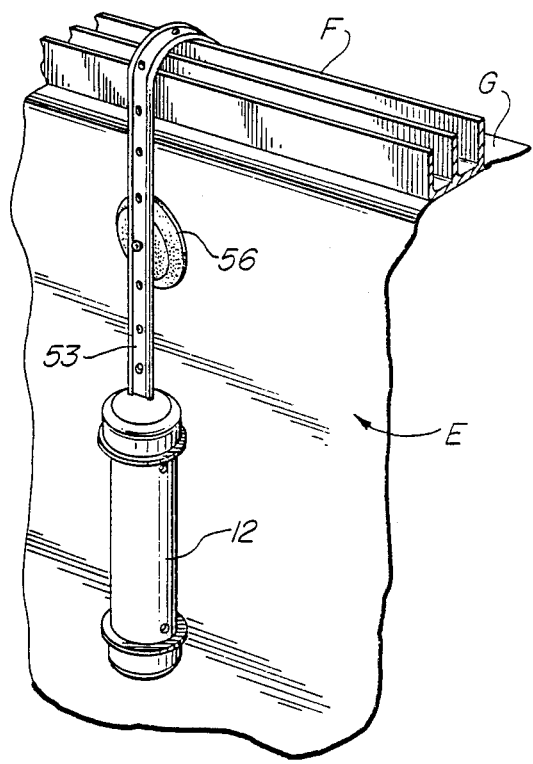
FIG. 10 is a fragmentary perspective view of the modified apparatus of FIG. 9 shown mounted in a different position.

FIG. 10 illustrates the use of the modified alarm apparatus of FIG. 9 on a bathtub E having a shower door rail F obstructing the ledge G of the tub. In the method of mounting shown in FIG. 10, suction cup 56 is shown fastened to the inner surface of sidewall A of bathtub D. Alternatively, suction cup 56 may be attached to the outside surface of sidewall A. In either position, a selected one of the perforations 55 through cable 53 may be engaged by stud 58 of suction cup 56 to retain sensor 12 at a desired height without requiring that the suction cup be attached to the obstructed horizontal ledge G of bathtub E.

Figure 11:
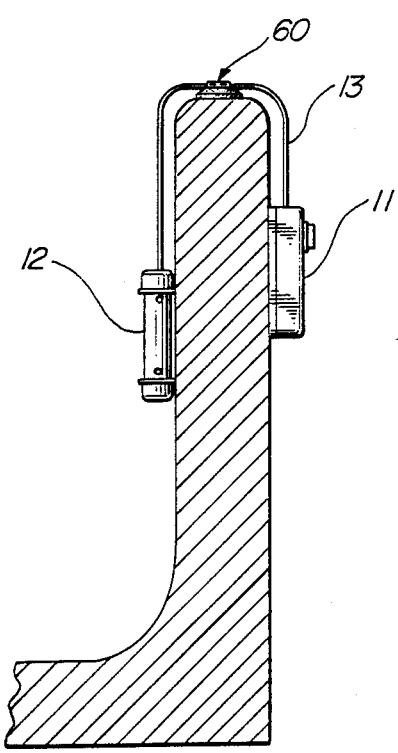
FIG. 11 is a side elevation view of another modification of the apparatus of FIG. 1 having different mounting means.

FIG. 11 illustrates a modification of the sensor interconnecting cable fastening means shown in FIGS. 9 and 10. The modification shown in FIG. 11 does not require perforations in the interconnecting cable.

Figure 12:
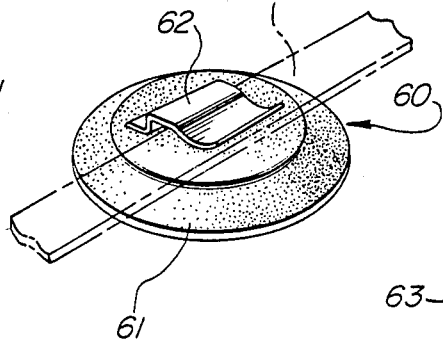
FIG. 12 is a perspective view of a mounting clip used in the apparatus of FIG. 11.

As shown in FIG. 11, a modified attachment means for the sensor interconnecting cable 13 includes a suction cup 60 having a flexible, convex lenticular shaped body 61 made of an air impervious, resilient material such as rubber. As may be seen best in FIG. 12, a thin spring clip 62 having in plan view a generally rectangular shape, and in edge view a serpentine shape with a central longitudinally disposed indentation adapted to clampingly receive an elongated cable 15, is attached to the upper surface of suction cup 60 and symmetrically disposed along a diameter of the suction cup. Lifting up the open edge of spring clip 62 permits sliding cable 13 within the clip to position sensor 12 at any desired height.

Figure 13:
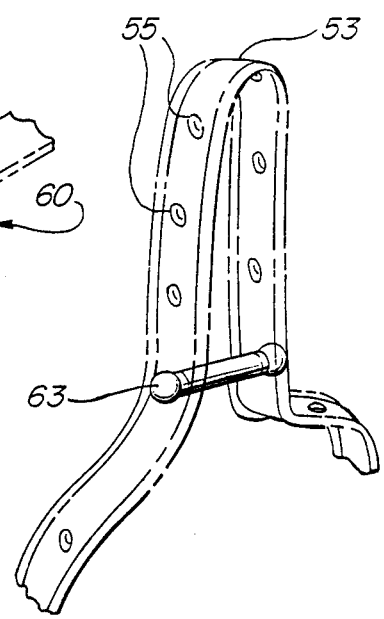
FIG. 13 is a perspective view of a modification of the apparatus shown in FIG. 9.

FIG. 13 illustrates another modification of the alarm apparatus of FIG. 9.

In the embodiment of alarm apparatus 10 shown in FIG. 13, control box 11 is placed near the inner side wall of a vessel, such as the swimming pool shown in FIG. 8. The height of sensor 12 suspended within the vessel is adjusted by forming in the interconnecting cable 53 joining the sensor to the control box in an upwardly extending loop of sufficient length to raise the sensor to a desired height. The length of the loop and therefore the height of he sensor is maintained at a selected value by clamping adjacent portions of cable 53 forming the bottom portion of the loop. A clamp of the type shown in FIG. 12 may be used for this purpose. Alternatively, as shown in FIG. 13, a cylindrical peg 63 adapted to fit snugly in perforations 55 in interconnecting cable 53 may be inserted through adjacent perforations in adjacent sides of a loop formed in the interconnecting cable to maintain the loop at a desired length.

Figure 14:
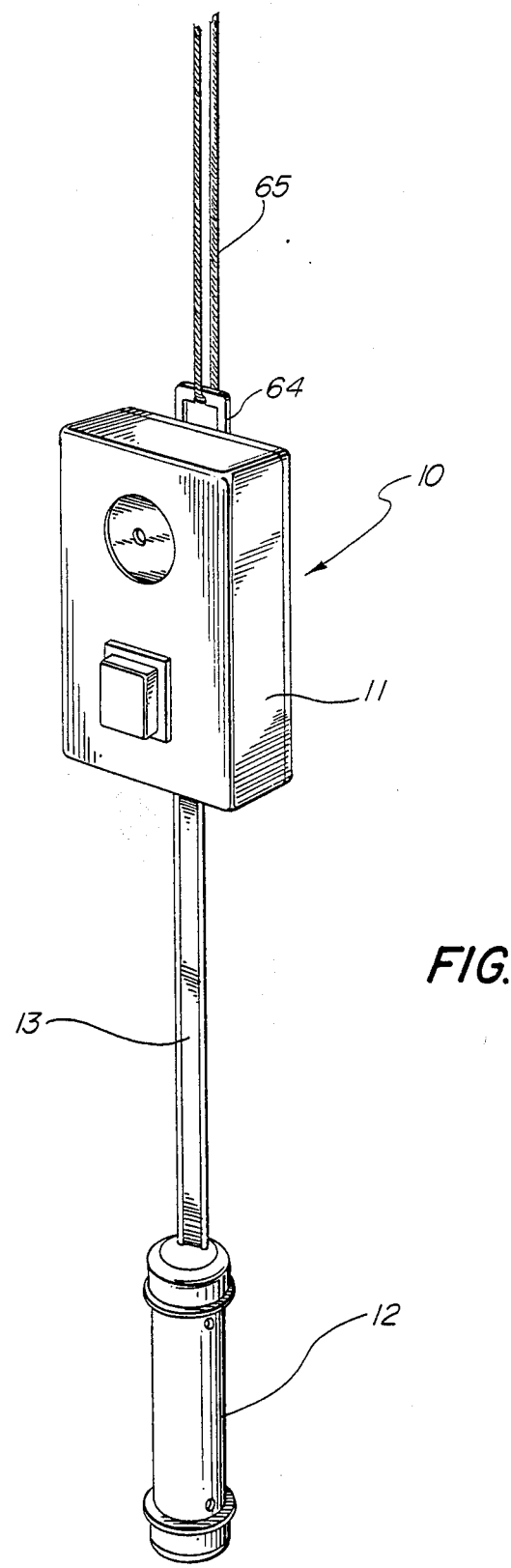
FIG. 14 is a perspective view of the apparatus of FIG. 1 in use with a deep liquid vessel.

The liquid level alarm apparatus according to the present invention may be used effectively to indicate liquid levels substantially below the rim of a vessel. Thus, as shown in FIG. 14, control box 11 may be suspended by means of a cord 65 fastened to ring 67 fastened to the bottom surface of control box 11 near the edge opposite the side of the control box to which sensor cable 13 is attached. If control box 11 is suspended by means of a tape measure, the end hook of which is inserted into the opening of ring 64, the depth of liquid deep in a vessel can be conveniently determined by unreeling the measuring tape, noting when the audible alarm 39 sounds, reading the length of tape played out from the tape measure reel, and adding to that dimension the length of the control box 11, sensor cable 13, and the actuation depth of reed switch 32 below the end of the sensor cable.

In each of the embodiments of the novel liquid level alarm apparatus discussed above, a visual indicator such as an incandescent bulb or a light emitting diode (LED) may also be energized by closure of the reed switch contacts. Also, the closure of the reed switch elements could be used to energize an electrically actuated solenoid valve, thereby shutting off the flow of liquid into a vessel when the level of liquid within the vessel reaches a pre-determined trip point. Closing or opening of the reed switch element may also be used to trigger a remote alarm, or to warn of changes in liquid level within a vessel.

What is claimed is:

1. An apparatus for providing an indication when liquid in a vessel has risen to a pre-determined level comprising:
   a. a sensor having (i) an elongated hollow cylindrical housing, (ii) an elongated cylindrical float axially slidable within said housing, (iii) means for limiting upward and downward axial motion of said float within said hollow cylindrical housing, (iv) means permitting ingress and egress of liquid into said cylindrical housing, and (v) means responsive to upward movement of said float a pre-determined distance in closing an electrical circuit, said means comprising in combination a solid permanent magnet fastened to the upper surface of said float with its magnetization axis parallel to the longitudinal axis of said float and a reed switch having at least two contact bars mounted within said sensor in the vicinity of said means for limiting upward axial motion of said float, the longitudinal axis of said reed switch being substantially colinear with the magnetization axis of said magnet, said reed switch thereby being responsive to upward motion of said permanent magnet in closing said contact bars of said reed switch, and
   b. means for suspending said sensor in said vessel with the longitudinal axis of said sensor being oriented in a generally vertical direction 2. The apparatus of claim 1 wherein said means for limiting upward axial motion of said float is further defined as a cylindrical upper cap closing the upper end of said cylindrical housing, and said means for limiting downward axial motion of said float is further defined as a cylindrical lower cap closing the lower opening of said cylindrical housing.

3. The apparatus of claim 1 wherein said means permitting ingress and egress of liquid into said cylindrical housing comprises at least one radially disposed perforation through the side wall of said cylindrical housing.

4. The apparatus of claim 3 wherein said means for suspending said sensor in a generally vertical orientation comprises an anisotropically bendable flexible cable connected to said upper cylindrical cap, said flexible cable contains at least two electrical conductors each one of said conductors being in separate electrical connection with a separate one of said reed switch contact bars.

5. The apparatus of claim 4 further comprising means for promoting vertical orientation of said sensor despite buoyancy of said sensor in a liquid, said means comprising a relatively dense weight in said bottom portion of said cylindrical housing.

6. The apparatus of claim 5 wherein said weight is further defined as a sphere made of dense material and resting on the upper inner surface of said lower cylindrical cap, said float normally resting on the upper surface of said sphere.

7. The apparatus of claim 6 further comprising additional means for permitting ingress and egress of liquid into the interior of said cylindrical housing of said sensor, said additional means comprising a narrow, rectangular cross-section perforation cut through the bottom transverse wall of said lower cylindrical cap.

8. The apparatus of claim 7 further comprising a control box electrically and mechanically connected to the proximal end of said cable, said control box containing in series with said reed switch element a power source, a power switch and an alarm indicator, said alarm indicator being operable by closure of said reed switch element to energize said alarm indicator, and said alarm indicator being capable of being disabled by opening said power switch.

9. The apparatus of claim 8 further comprising means for adjustably positioning said control box near said vessel whereby the height of said sensor suspended from said cable connected to said control box may be adjusted to a pre-determined height.

10. The apparatus of claim 9 wherein said means for adjusting said control box near said vessel comprises at least a portion of the bottom wall of said control box having a high coefficient of sliding friction.

11. The apparatus of claim 9 wherein said means for adjustably positioning said vessel comprises at least one hook and eye type fabric fastener strip attached to a surface of said control box, and a complementary fabric fastener strip fastened to a surface fixed relative to said vessel.

12. The apparatus of claim 8 further comprising means for adjusting the sensor-suspending length of said cable relative to said vessel, whereby the height of said sensor may be adjusted to a redetermined value.

13. The apparatus of claim 12 wherein said means for adjusting the sensor-suspending length of said cable comprises in combination:

a. a plurality of perforations through said cable disposed at longitudinally spaced intervals along the cable, and b. an anchor member adapted to attachment to a structure wall fixed with respect to said vessel, said anchor member having an upwardly projecting stud adapted to insert into a selected one of said plurality of perforations.

14. The apparatus of claim 13 wherein said anchor member is further defined as a generally lenticular-shaped suction cup having an axial stud projecting upwards from its upper convex surface.

15. The apparatus of claim 13 wherein said anchor member is further defined as a generally lenticular-shaped suction cup having a spring clip attached to its upper convex surface.

16. The apparatus of claim 12 wherein said means for adjusting the sensor-suspending length of said cable comprises an anchor member adapted to attachment to a structure wall fixed with respect to said vessel, said anchor member having on its upper surface an elastically deformable clamping member adapted to engage a section of outer surface of said cable.

17. An apparatus for providing an indication when liquid in a vessel has reached a pre-determined level comprising:

a. an elongated sensor body having a hollow interior and means permitting the flow of liquid into and out of the interior of said sensor body from the exterior of said sensor body, b. a float longitudinally slidably contained within said sensor body, the longitudinal position of said float being responsive to the level of liquid within the interior of said sensor body, c. means responsive to the longitudinal position of said float within said sensor body in closing an electrical switch, thereby providing an indication when liquid in said vessel has reached a predetermined level, said means comprising.

(i) a permanent magnet fastened to said float near an upper end of said float, and (ii) a switch responsive to sufficiently close approach of said permanent magnet in closing said switch, and (d) means for flexibly suspending said sensor body in said vessel, said means comprising a flexible cable which is more readily bendable about axes transverse to the longitudinal axis of the cable then about axes normal to the longitudinal axis of the cable.

18. The apparatus of claim 17 wherein said flexible cable is further defined as having generally flat and parallel upper and lower surfaces and being freely bendable about axes transverse to the longitudinal axis of said cable, but bendable with greater difficulty about other axes.

19. The apparatus of claim 18 wherein said switch is further defined as being a reed switch having two contact bars.

20. The apparatus of claim 19 wherein the distal end of said flexible cable is fastened to said sensor body near the upper end of said sensor body.

21. The apparatus of claim 20 wherein said flexible cable includes a separate electrical conductor connected to each of said reed switch contact bars.

22. The apparatus of claim 21 further comprising a control box connected mechanically and electrically to the proximal end of said cable, said control box comprising:
- a. an electrical power source having a ground terminal and an active terminal, the active terminal of said power source being electrically connected to a first one of said cable conductors connected to a first one of said reed switch contact bars,
- b. an electrical power switch having two terminals, the first terminal of said power switch being electrically connected to a second one of said cable conductors connected to a second one of said reed switch contact bars, and
- c. an alarm indicator having two input terminals, the first terminal of said alarm indicator being electrically connected to said second terminal of said power switch, and the second terminal of said alarm indicator being connected to said ground terminal of said power source, whereby closure of said power switch contacts and said reed switch contact bars causes electrical energization of said alarm indicator.

23. The apparatus of claim 22 further comprising means for adjustably positioning said control box near said vessel, whereby the height of said sensor suspended form said cable connected to said control box may be adjusted to a pre-determined level.

24. The apparatus of claim 22 further comprising means for adjusting the length of said cable between said control box and said sensor, whereby the height of said sensor may be adjusted to a pre-determined value.

* * * * *